United States Patent
Eichler et al.

(10) Patent No.: US 12,292,134 B2
(45) Date of Patent: May 6, 2025

(54) SOLENOID VALVE ASSEMBLY WITH CONFIGURABLE SOLENOID CONNECTION

(71) Applicant: Parker-Hannifin Corporation, Cleveland, OH (US)

(72) Inventors: Mitchell P. Eichler, Lakewood, OH (US); David M. Converse, Columbia Station, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/570,318

(22) PCT Filed: Aug. 22, 2022

(86) PCT No.: PCT/US2022/041002
§ 371 (c)(1),
(2) Date: Dec. 14, 2023

(87) PCT Pub. No.: WO2023/034048
PCT Pub. Date: Mar. 9, 2023

(65) Prior Publication Data
US 2024/0218939 A1    Jul. 4, 2024

Related U.S. Application Data

(60) Provisional application No. 63/337,702, filed on May 3, 2022, provisional application No. 63/240,381, filed on Sep. 3, 2021.

(51) Int. Cl.
*F16K 31/06* (2006.01)
*F16K 27/04* (2006.01)

(52) U.S. Cl.
CPC ........ *F16K 31/0675* (2013.01); *F16K 27/048* (2013.01)

(58) Field of Classification Search
CPC ............. F16K 31/0675; F16K 31/0679; F16K 27/048; H01F 2007/062
See application file for complete search history.

(56) References Cited

U.S. PATENT DOCUMENTS

| 4,136,713 A | 1/1979 | Humphreys |
| 4,308,891 A | 1/1982 | Loup |

(Continued)

FOREIGN PATENT DOCUMENTS

| DE | 102007009963 A1 | 9/2008 |
| DE | 102017125761 A1 | 5/2018 |

(Continued)

OTHER PUBLICATIONS

International Search Report and Written Opinion for corresponding International Patent Application No. PCT/US2022/041002, mailed Feb. 16, 2023.

(Continued)

*Primary Examiner* — Kelsey E Cary
(74) *Attorney, Agent, or Firm* — Renner, Otto, Boisselle & Sklar, LLP

(57) ABSTRACT

A valve assembly includes a valve body that houses valve components for controlling a flow of fluid through the valve body, and a solenoid component that controls operation of the valve components. The solenoid component includes a connector cap that is attached to a solenoid base, the connector cap having a plurality of electrical connection openings oriented at different directions that are configurable at multiple orientations corresponding to different directions connection paths with the solenoid component. The solenoid component is rotatable about a longitudinal axis relative to the valve body to configure the electrical connection openings at one of multiple first orientations corresponding to a rotational position of the solenoid component relative to the valve body. The connector cap is (Continued)

rotatable about a transverse axis relative to the solenoid base to configure the electrical connection openings at one of multiple second orientations corresponding to a rotational position of the connector cap relative to the solenoid base.

12 Claims, 4 Drawing Sheets

(56) References Cited

U.S. PATENT DOCUMENTS

| | | | |
|---|---|---|---|
| 4,671,600 A | 6/1987 | Sawai et al. | |
| 4,736,177 A | 4/1988 | Vollmer et al. | |
| 6,017,249 A | 1/2000 | Akimoto et al. | |
| 6,041,816 A | 3/2000 | Hiramatsu et al. | |
| 6,684,896 B2 * | 2/2004 | Weiss | F16K 27/029 251/129.21 |
| 6,979,222 B2 | 12/2005 | Comini | |
| 7,982,564 B2 | 7/2011 | Farrar et al. | |
| 11,009,143 B1 | 5/2021 | Brookins | |
| 2012/0168657 A1 | 7/2012 | Hentschel et al. | |
| 2018/0267564 A1 | 9/2018 | Hutchins et al. | |

FOREIGN PATENT DOCUMENTS

| | | |
|---|---|---|
| DE | 102017114036 A1 | 12/2018 |
| EP | 2218949 A1 | 8/2010 |
| WO | 2014033728 A2 | 3/2014 |

OTHER PUBLICATIONS

International Preliminary Report on Patentability for corresponding International Patent Application No. PCT/US2022/041002, mailed Jul. 14, 2023.

* cited by examiner

SOLENOID VALVE ASSEMBLY WITH CONFIGURABLE SOLENOID CONNECTION

This application is a national phase of International Application No. PCT/US2022/041002, filed Aug. 22, 2022, which claims priority to U.S. Provisional Patent Application No. 63/337,702, filed May 3, 2022, and U.S. Provisional Patent Application No. 63/240,381, filed Sep. 3, 2021, each of which is hereby incorporated herein by reference in its entirety.

FIELD OF INVENTION

The present application relates to solenoid valve assemblies that are particularly suitable for use in hazardous environments, such as for example in oil and gas drilling operations.

BACKGROUND OF THE INVENTION

Valves used in hazardous environments, such as for example in oil and gas drilling applications, typically require approval from one or more regulatory agencies, including for example ATEX, IECEx, and CSA/UL. For valve connections in these types of applications, expensive fittings with similar ratings must be used to meet the various safety and other operational requirements. When electrical components, like solenoids, are used in these environments, to satisfy the safety and operational requirements valve assemblies typically employ expensive fittings with fixed orientations and arrangements, such as for example fittings with 90° bends, fixed straight connectors, and the like depending upon an orientation or configuration suitable for a particular usage. Because of the hazardous nature of the environment of use, when a solenoid coil or associated electrical component is damaged, the electrical equipment cannot be operated until the damaged component is replaced. Conventional connectors, however, render replacement difficult due to the fixed nature of the orientation or configuration. In addition, the fixed nature of conventional configurations requires valve assemblies to be manufactured for an orientation or configuration associated with a particular use, and therefore a given valve assembly is not versatile for a wide variety of uses.

In conventional configurations, a solenoid component of the valve assembly has a single configuration connector cap that includes an opening for electrical connection with a valve body that contains the valve components that control the fluid flow. The connector cap is attached to a face of a solenoid base of the solenoid component. The connector cap cannot rotate or otherwise be connected in different configurations relative to the attached face of the solenoid base. Accordingly, the fixed configuration of the connector cap dictates the orientation and position of the pathway of the electrical connection to or from the solenoid components of the valve assembly. For example, the conventional connector cap may have an electrical connection opening that opens horizontally relative to the solenoid base, or alternatively the conventional connector cap may have an electrical connection opening that opens vertically relative to the solenoid base. In either configuration, the configuration dictated by the connector cap is fixed at the time of manufacture of the connector, and the connector cap otherwise is connected at a fixed position to the solenoid base and is not configurable at different positions or orientations relative to the solenoid base.

The fixed, single configuration nature of conventional configurations renders such valve assemblies unsuitable for different potential orientations required by different uses, and therefore multiple electrical connection fittings and connectors may be needed to achieve a desired electrical connection path. The multiple connection points are particularly undesirable in hazardous environments as the multiple connection points provide added points of potential failure. The fixed, single configuration nature of conventional configurations also renders replacement of any damaged electrical components more difficult, as the various multiple connections must be removed to gain access to the damaged component.

SUMMARY OF THE INVENTION

The present application describes a valve assembly with an enhanced solenoid component that provides electrical connections that are connectable in multiple different configurations or orientations. The solenoid component of the valve assembly includes a connector cap attached to a solenoid base, and the connector cap includes a plurality of connection openings that are configurable in one of multiple different orientations. The solenoid component can be rotated relative to a valve body that houses valve components of the valve assembly about a longitudinal axis of the solenoid component, to configure the connection openings along first orientations relative to the longitudinal axis. In addition, as to the solenoid component the connector cap of the solenoid component can be rotated relative the solenoid base of the solenoid component about a transverse axis of the solenoid component, the transverse axis being perpendicular to the longitudinal axis, to configure the connection openings along second orientations relative to the transverse axis. Connection openings that would not be used for electrical connection in a given orientation or configuration are plugged. The valve assembly may be configured as either a single solenoid valve assembly in which a single solenoid component operates the valve components, or in a dual solenoid valve assembly in which two solenoid components are located on opposing ends of the valve body and operate the valve components.

Accordingly, the solenoid component is rotatable relative to the valve body about the longitudinal axis, and the solenoid connector cap is rotatable relative to the solenoid base about the transverse axis, to permit configurability of the connection openings in one of multiple orientations. To optimize the valve assembly to be particularly suitable for hazardous environment approval, the ability to configure the solenoid component with the connection openings in one of multiple orientations minimizes the number of explosion-proof connectors or fittings required achieve the desired electrical connection paths. Such minimization also can reduce the repair and replacement time for the electrical components in the event of a malfunction, as the solenoid component is more readily accessible.

In exemplary embodiments, each solenoid component employs a configurable connector cap attached to a solenoid base. The connector cap has two electrical connection openings, whereby in an initial position a first connection opening opens perpendicular to the longitudinal axis of the solenoid base, and a second connection opening opens perpendicular to the transverse axis of the solenoid base. Thus, the two electrical connection openings are oriented perpendicularly to each other. Only one of the connection openings is used in service, and the unused connection opening is plugged. The solenoid component is rotatable about the longitudinal axis relative to the valve body to configure the first and second connection openings to first orientations about the longitudinal axis. Additionally, as to the solenoid component the connector cap of the solenoid component can be rotated relative the solenoid base of the solenoid component about the transverse axis perpendicular to the longitudinal axis, to configure the second connection opening to second orientations about the transverse axis. In one example, the first orientations include any angle of rotation about the longitudinal axis relative to the valve body, and/or the second orientations are indexed every 90 degrees of rotation about the transverse axis of the connector cap relative to the solenoid base. This configurability to one of multiple orientations allows selection of a more precise alignment of the electrical connection openings to minimize the number of connectors or fittings required to achieve a given electrical connection direction, thereby reducing the number of connection points for potential failure.

In exemplary embodiments, the valve body that houses the valve components includes a threaded nut for receiving external threading of a threaded retainer of the solenoid component, and mating of the threaded nut with the threaded retainer secures the solenoid component to the valve body in a rotatable manner. In the event of damage to an electrical element of the solenoid component (e.g., the solenoid coil), the entire solenoid component can be removed from the valve body. A threaded valve cap then may be installed to the valve body via the threaded nut to hold the valve components in a desired position until the damaged solenoid component can be replaced. As another option, one of the solenoid components may be replaced with the threaded valve cap to implement a single solenoid configuration in which only one solenoid drives the valve components.

An aspect of the invention, therefore, is an enhanced solenoid component with multiple electrical connection openings that are configurable in different orientations. In exemplary embodiments, a valve assembly includes a valve body that houses valve components for controlling a flow of fluid through the valve body and at least one solenoid component that controls operation of the valve components. The at least one solenoid component includes a connector cap that is attached to a solenoid base, the connector cap having a plurality of electrical connection openings including a first electrical connection opening and a second electrical connection opening that are oriented at different directions relative to each other, and the first and second electrical connection openings are configurable at multiple orientations corresponding to different directions of connection paths to and from the solenoid component. The at least one solenoid component is rotatable about a longitudinal axis of the at least one solenoid component relative to the valve body to configure the first and second electrical connection openings at one of multiple first orientations, wherein each of the multiple first orientations corresponds to a rotational position of the at least one solenoid component relative to the valve body. The connector cap is rotatable about a transverse axis of the at least one solenoid component relative to the solenoid base to configure the first and second electrical connection openings at one of multiple second orientations, wherein each of the multiple second orientations corresponds to a rotational position of the connector cap relative to the solenoid base.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
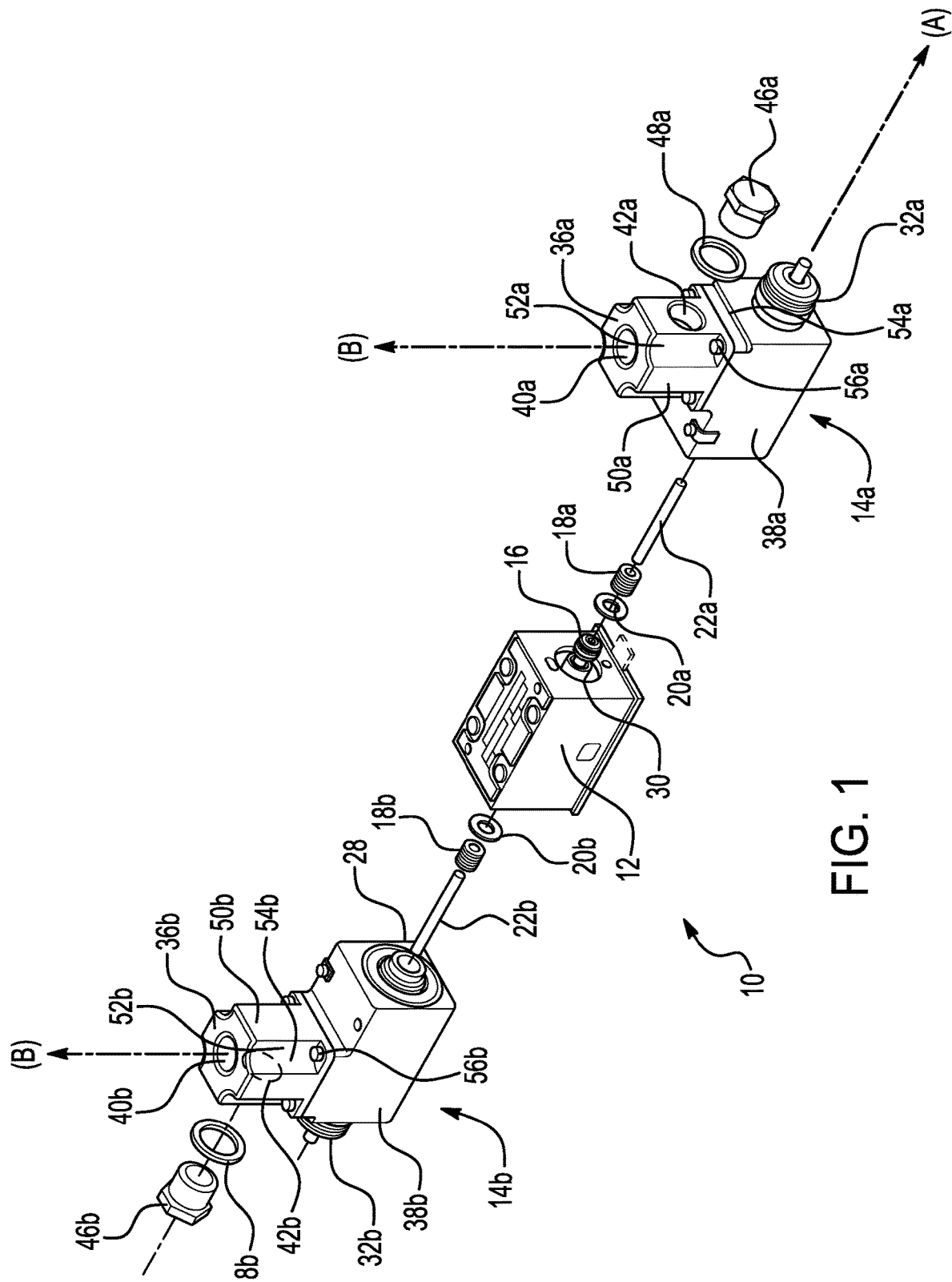
FIG. 1 is a drawing depicting a perspective and exploded view of an exemplary valve assembly with configurable solenoid components, with electrical connection openings of the solenoid component being in a first configuration.

Embodiments of the present application will now be described with reference to the drawings, wherein like reference numerals are used to refer to like elements throughout. It will be understood that the figures are not necessarily to scale.

Figure 2:
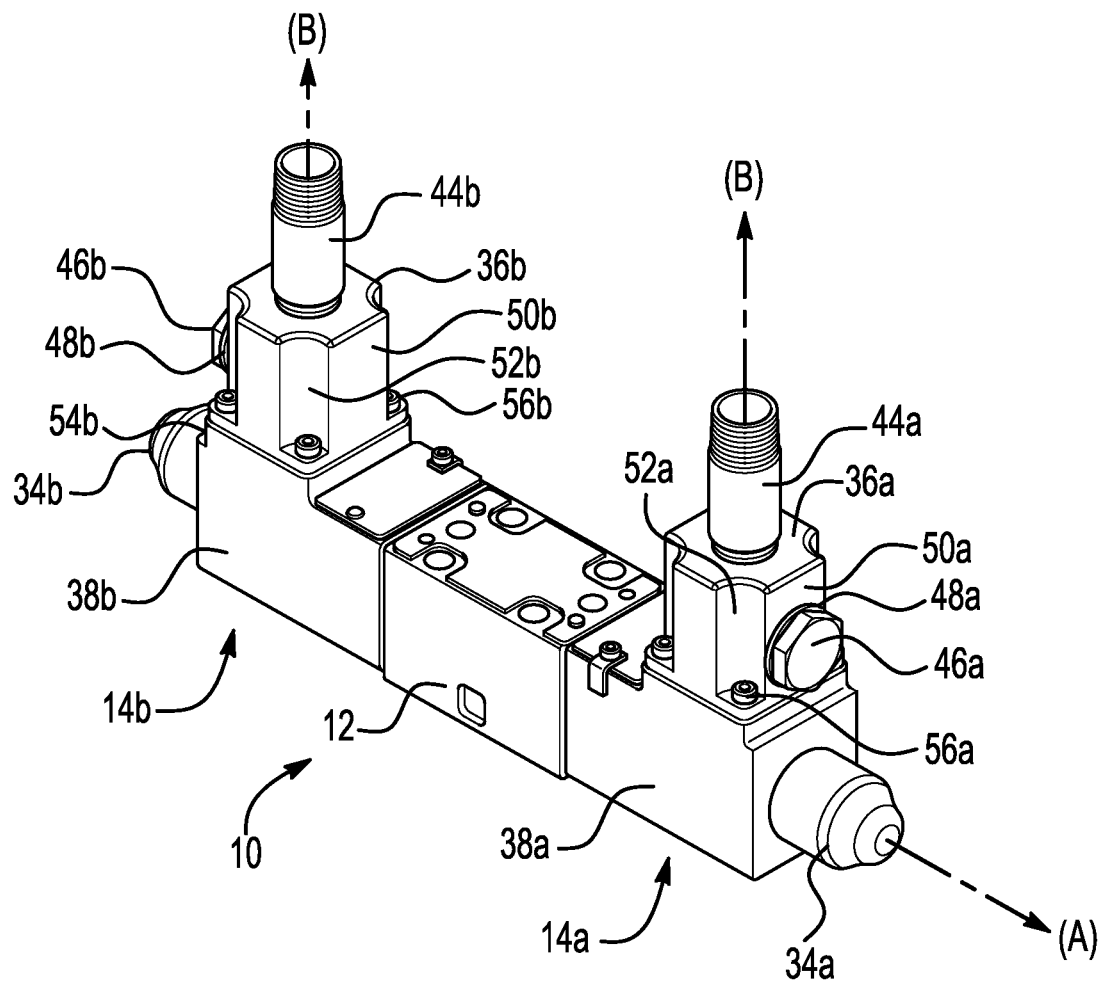
FIG. 2 is a drawing depicting a non-exploded perspective view of the exemplary valve assembly of FIG. 1.

FIG. 1 is a drawing depicting a perspective and exploded view of an exemplary valve assembly 10 with configurable solenoid components in accordance with embodiments of the present application. FIG. 2 is a drawing depicting a non-exploded perspective view of the exemplary valve assembly 10 of FIG. 1. The valve assembly 10 includes a valve body 12 that houses valve components that control a flow of fluid through the valve assembly. In the example of FIGS. 1 and 2, the valve assembly 10 has a dual solenoid configuration in which a first solenoid component 14*a* and a second solenoid component 14*b* are located on opposing ends of the valve body 12, and which operate the valve components as are known in the art. Any suitable, solenoid-operable valve components may be employed and housed within the valve body 12. In the example of FIG. 1, the valve components have a spool valve configuration that includes a spool 16 that is biased by opposing springs 18*a* and 18*b*, and supported using washers 20*a* and 20*b*. The solenoid components 14*a* and 14*b* respectively include actuation rods 22*a* and 22*b*, which are driven by the electrical components of the solenoid components to control the positioning of the spool 16 for the control of fluid flow. The valve assembly 10 also may be configured to have a single solenoid configuration utilizing only one or the other of the solenoid components, as further detailed below.

Each solenoid component 14*a*/14*b* further includes a respective threaded retainer 28 that secures the solenoid components to the valve body 12 in a rotatable manner (the threaded retainer on solenoid component 14*a* is not visible in the viewpoint of FIG. 1). More specifically, the threaded retainers 28 attach the solenoid components 14a/14b to the valve body 12 in a rotatable manner that permits the solenoid components 14a/14b to be rotated individually relative to the valve body 12, as further detailed below. The threaded retainers 28 are rotatably connected to threaded nuts 30 located in the valve body 12 (the threaded nut of the valve body that connects to solenoid component 14b is not visible in the viewpoint of FIG. 1). The solenoid components 14a/14b further include respective end fasteners 32a/32b that receive end caps 34a/34b (see FIG. 2). When the end caps 34a/34b are tightened over the end fasteners 32a/32b, the solenoid components and the valve body are maintained fixed together to hold the valve assembly components in a particular configuration or orientation of the solenoid components relative to the valve body.

FIGS. 1 and 2 are used to define orientation axes of the solenoid components 14a and 14b. In particular, the solenoid components include a longitudinal axis (A) and a transverse axis (B) of each of the solenoid components that is perpendicular to the longitudinal axis (A).

The solenoid components 14a and 14b of the valve assembly 10 respectively include a connector cap 36a/36b attached to a solenoid base 38a/38b. Generally, the connector caps include a plurality of electrical connection openings that are configurable to one of multiple different orientations. As further detailed below, the solenoid components individually can rotate relative to the valve body that houses valve components of the valve assembly about the longitudinal axis (A) of the solenoid components, to configure the electrical connection openings along first orientations relative to the longitudinal axis. In addition, as to the solenoid components the connector caps of the solenoid components individually can be rotated relative to the respective solenoid bases of the solenoid components about the transverse axis (B), to configure the electrical connection openings along second orientations relative to the transvers axis. Electrical connection openings that would not be used for electrical connection in a given orientation are plugged.

Referring particularly to the exploded view of FIG. 1, as referenced above each solenoid component 14a/14b has a configurable connector cap 36a/36b attached to a solenoid base 38a/38b. Each connector cap 36a/36b has a plurality of electrical connection openings. In the orientation depicted in FIG. 1, the plurality of electrical connection openings includes at least a first electrical connection opening 40a/40b that opens perpendicular to the longitudinal axis (A) of the solenoid base 38a/38b, and a second electrical connection opening 42a/42b that opens perpendicular to the transverse axis (B) of the solenoid base 38a/38b (the electrical connection opening 42b is not directly visible in the viewpoint of FIG. 1). More generally, the first electrical connection openings 40a/40b open in a first direction and the second electrical connection openings 42a/20b open in a second direction, and the first and second directions are perpendicular to each other. FIG. 1 and FIG. 2 (non-exploded view) illustrate the solenoid components in which the electrical connection openings are in a first configuration. In this first configuration, the first electrical connection openings 40a/40b extend in a vertical direction as oriented in the figures, and the second electrical connection openings 42a/42b extend horizontally as oriented in the figures. It will be appreciated that terms such as "vertical" and "horizontal" are used for convenient description in view of the orientations shown in the drawings, and that the overall valve assembly 10 generally may be oriented in any direction as suitable for a particular application.

Only one of the electrical connection openings of a given solenoid connector is used in service, and the unused electrical connection opening in the given connector cap is plugged. With further reference to FIG. 2, in this particular example the first electrical connection openings 40a/40b are the electrical connection openings being used. Accordingly, FIG. 2 illustrates electrical connectors 44a/44b that are connected to the electrical connection openings 40a/40b being used for the electrical connection with the solenoid components of the valve assembly. The unused second electrical connection openings 42a/42b are plugged using plugs 46a/46b. The retention of the plugs within the electrical connection openings may be enhanced by the use of washers 48a/48b. The used versus unused electrical connection openings may be altered to provide electrical connection paths of different directions relative to the solenoid component. For example, electrical connectors may be connected to the second electrical connection openings 42a/42b with the first electrical connection openings 40a/40b being plugged by the plugs 46a/46b. Similarly, first electrical connection opening 40a and second electrical connection opening 42b may be the used electrical connection openings with second electrical connection opening 42a and first electrical connection opening 40b being plugged, or vice versa. Accordingly, the one of the first electrical connection opening or the second electrical connection opening that receives the plug is an unused electrical connection opening and is blocked, and the other of the first electrical connection opening or the second electrical connection opening that does not receive the plug is a used electrical connection opening through which the electrical connection runs to the solenoid component. In this manner, by employing a plurality of electrical connection openings with perpendicular orientations within a given solenoid component, different configurations of the electrical connection openings, and the resultant electrical connection paths to the solenoid component, can be realized with a single valve assembly 10 depending upon which electrical connection openings are used versus which electrical connection openings are plugged.

Additional configurations of the electrical connection openings, and therefore the resultant electrical connection paths, further may be achieved by rotation of the solenoid components, and/or by rotation of the connector caps. In general, each solenoid component 14a/14b is rotatable about the longitudinal axis (A) relative to the valve body 12 to configure the first electrical connection openings 40a/40b and the second electrical connection openings 42a/42b to first orientations about the longitudinal axis (A). Additionally, as to a given the solenoid component, the connector cap 36a/36b of the solenoid component is rotatable relative the solenoid base 38a/38b of the solenoid component about the transverse axis (B) to configure the second electrical connection openings 42a/42b to second orientations about the transverse axis. In one example, the first orientations include any angle of rotation about the longitudinal axis relative to the valve body, and/or the second orientations are indexed every 90 degrees of rotation about the transverse axis of the connector cap relative to the solenoid base. To optimize the valve assembly to be particularly suitable for hazardous environment approval, the ability to configure the solenoid components with the electrical connection openings in one of multiple orientations minimizes the number of explosion-proof connectors or fittings required achieve the desired connection paths, thereby reducing the number of connection points for potential failure. Such minimization also can reduce the repair and replacement time for the electrical components in the event of a malfunction, as the solenoid components are more readily accessible.

Figure 3:
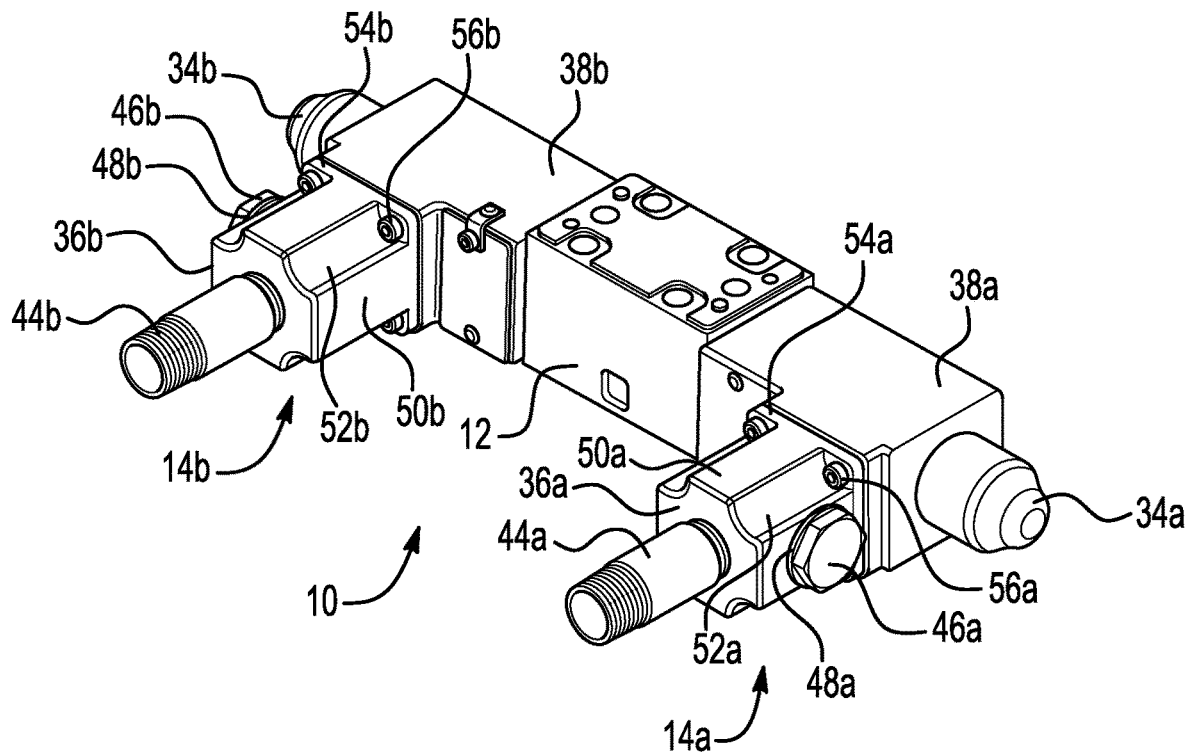
FIG. 3 is a drawing depicting a perspective view of the exemplary valve assembly of FIG. 2, with electrical connection openings of the solenoid components being in a second configuration.

For example, FIG. 3 is a drawing depicting a perspective view of the exemplary valve assembly 10 of FIG. 2, with the electrical connection openings of the solenoid components being in a second configuration. In comparison to FIG. 2, in this example of FIG. 3 solenoid component 14a has been rotated about the longitudinal axis (A) counterclockwise 90° relative to the valve body 12, and oppositely facing solenoid component 14b has been rotated about the longitudinal axis (A) clockwise 90° relative to the valve body 12, such that the electrical connectors 44a and 44b are extending from the solenoid connectors in the same direction. In this particular example, therefore, first electrical connection openings 40a/40b open horizontally in a direction perpendicular to the longitudinal axis (A), and second electrical connection openings 42a/42b also open horizontally but in a direction parallel to the longitudinal axis (A). Variations on the configuration of the first and second electrical connection openings can be achieved insofar as the solenoid components may be rotated by any angle of rotation about the longitudinal axis (A) relative to the valve body 12. In addition, each solenoid component 14a and 14b may be rotated individually and independently of the other solenoid component, and therefore the solenoid components 14a and 14b may be rotated in different directions and/or by different angles of rotation about the longitudinal axis (A) relative to the valve body 12. Once a given orientation configuration is selected, the position may be fixed by tightening the end caps 34a and 34b onto the end fasteners 32a and 32b that are visible in FIG. 1.

Similarly as in FIG. 2, in the configuration of FIG. 3 the first electrical connection openings 40a/40b are the used electrical connection openings that are connected with the electrical connectors 44a/44b, and the second electrical connection openings 42a/42b are the unused electrical connection openings that are plugged by the plugs 46a/46b. As described above, different configurations of the electrical connection openings may be obtained for a given rotational angle by altering the combination of the used versus plugged electrical connection openings.

Figure 4:
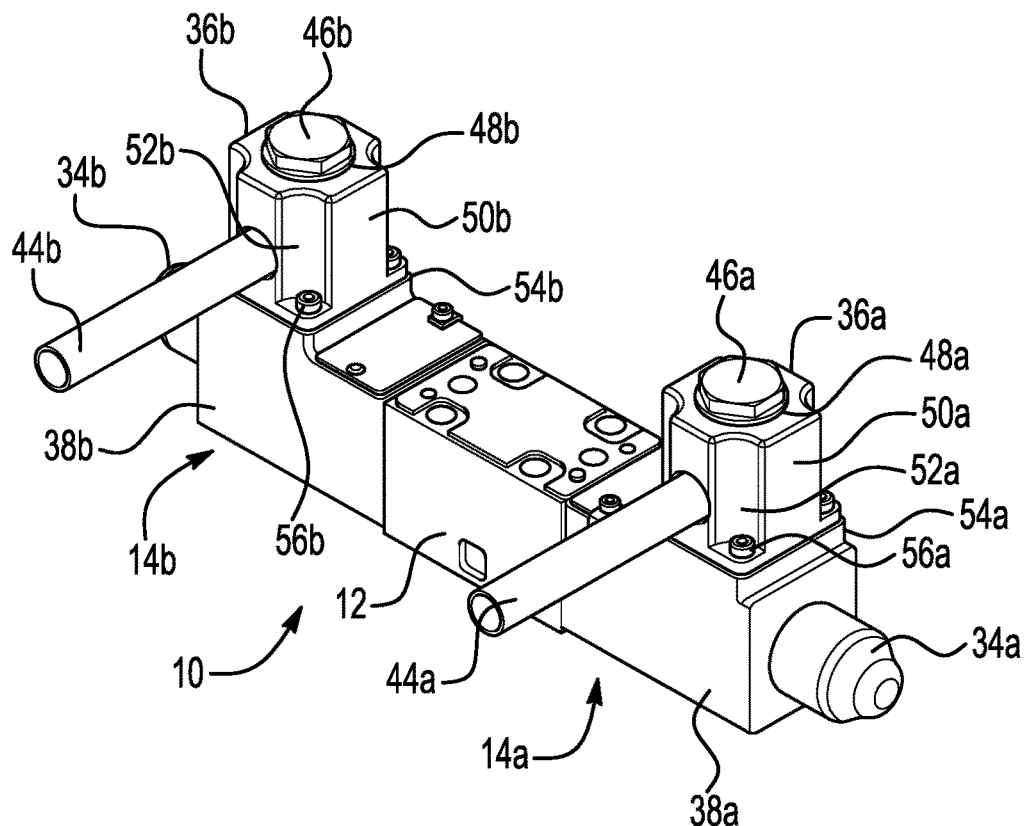
FIG. 4 is a drawing depicting a perspective view of the exemplary valve assembly of FIG. 2, with electrical connection openings of the solenoid components being in a third configuration.

As another example, FIG. 4 is a drawing depicting a perspective view of the exemplary valve assembly 10 of FIG. 2 with electrical connection openings of the solenoid components being in a third configuration. FIG. 4 illustrates how different configurations of the electrical connection openings may be achieved based on a rotational position of the solenoid connector caps 36a/36b relative to the respective solenoid bases 38a/38b. In comparison to FIG. 2, in this example of FIG. 4, as to first solenoid component 14a the connector cap 36a has been rotated about the transverse axis (B) clockwise 90° relative to the solenoid base 38a. As to oppositely facing solenoid component 14b, the connector cap 36b has been rotated about the transverse axis (B) counterclockwise 90° relative to the solenoid base 38b, such that the electrical connectors 44a and 44b are extending from the connector caps in the same direction. In this particular example, therefore, first electrical connection openings 40a/40b open vertically in a direction along the transverse axis (B), and second electrical connection openings 42a/42b open horizontally in a direction perpendicular to a vertical plane that includes both the longitudinal axis (A) and the transverse axis (B). Note that for a given rotational position of a solenoid component 14a/14b relative to the valve body 12, rotation a connector cap 36a/36b relative to a solenoid base 38a/38b will not alter the orientation of the respective first electrical connection opening 40a/40b.

In exemplary embodiments, the rotational position of the solenoid connector cap 36a/36b relative to a respective solenoid base 38a/38b is indexed to 90° increments, thereby permitting four directional orientations of the connector caps and corresponding second electrical connection openings relative to the solenoid bases, the increments being oriented 90° apart. As shown in the example of FIG. 4, each connector cap 36a/36b includes four planar faces 50a/50b, separated equidistantly by four curved faces 52a/52b. The planar and curved faces extend from a base plate 54a/54b. The planar faces, curved faces, and base plate of a given solenoid connector cap may be formed of a single, integral piece of material. The curved faces constitute recesses for positioning fastening elements 56a/56b, which fix the base plate 54a/54b of the connector cap 36a/36b to the respective solenoid base 38a/38b. The fastening elements may be bolt fasteners, screw fasteners, or any other suitable fastening element. With such configuration, each connector cap may be fixed to the respective solenoid base in one of four orientations that are oriented at 90° increments of rotation, thereby permitting four 90° directional orientations of the second electrical connection opening. In addition, each connector cap 36a and 36b may be rotated individually and independent of the other connector cap, and therefore the connector caps 36a and 36b may be in different rotational positions about the respective transverse axis (B).

Also in this example of FIG. 4 relative to FIG. 2, the used versus unused plugged electrical connection openings are reversed—in FIG. 4 the second electrical connection openings 42a/42b are now the used electrical connection openings connected to the electrical connectors 44a/44b, and the first electrical connection openings 40a/40b are now the unused electrical connection openings that are plugged by the plugs 46a/46b Similarly as described above, additional different configurations of the electrical connection openings may be obtained for a given rotational position of the connector caps by altering the combination of the used versus plugged electrical connection openings.

In view of the above, it is illustrated that various configurations of the electrical connection openings may be achieved by different combinations of one or more of: (1) rotational position of each of the solenoid components relative to the valve body; (2) rotational position of each of the connector caps relative to a respective solenoid base of the solenoid components; and (3) the used connected electrical connection openings versus the unused plugged electrical connection openings. As referenced above, this configurability to one of multiple orientations allows selection of a more precise alignment of the electrical connection openings to minimize the number of connectors or fittings required to achieve a given connection direction, thereby reducing the number of explosion-proof connection points for potential failure. Such minimization also can reduce the repair and replacement time for the electrical components in the event of a malfunction, as the solenoid components are more readily accessible.

Figure 5:
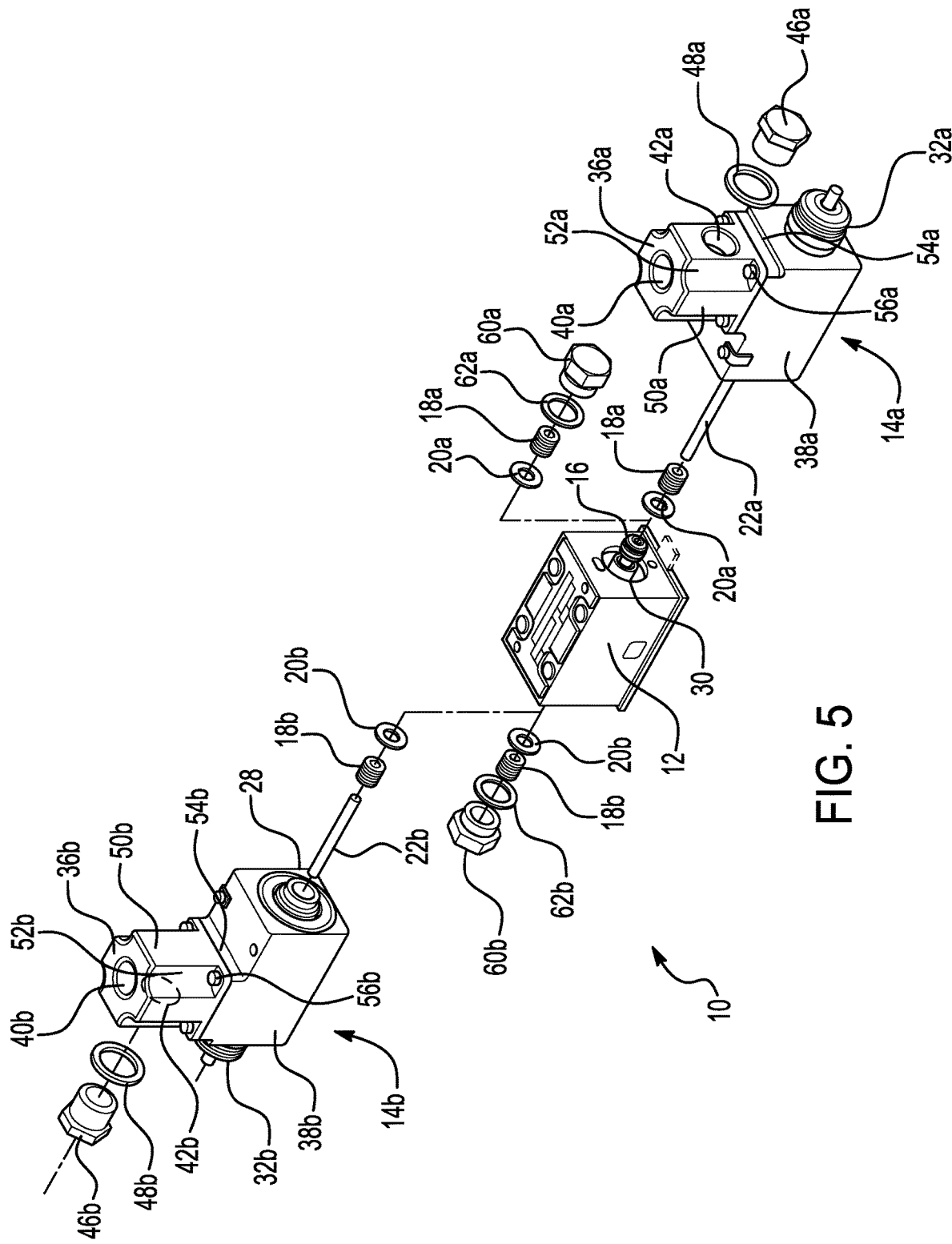
FIG. 5 is a drawing depicting a perspective and exploded view of a variation of the exemplary valve assembly of FIG. 1.

FIG. 5 is a drawing depicting a perspective and exploded view of an exemplary valve assembly 10a that is a variation of the exemplary valve assembly 10 of FIG. 1. As referenced above, one potential configuration the valve assembly 10/10a is a dual solenoid configuration in which the first solenoid component 14a and the second solenoid component 14b are located on opposing ends of the valve body 12. In addition, the threaded retainers 28 attach the solenoid components 14a/14b to the valve body 12 in a rotatable manner by connecting to threaded nuts 30 located in the valve body 12, and mating of the threaded nuts with the threaded retainers secures the solenoid components to the valve body in said rotatable manner. In an alternative configuration, at least one of the solenoid components may be absent, and instead replaced by a threaded valve cap that is connected to the valve body 12 via the threaded nut 30.

Referring to FIG. 5, the dashed lines of the exploded view illustrate the alternative configuration in which a given solenoid component is replaced with a threaded valve cap. In particular, the first solenoid component 14a may be replaced by a threaded valve cap 60a. After the spring 18a is inserted in the valve body 12 and secured with the washer 20a, the valve cap 60a is threaded into the threaded nut 30 of the valve body to secure the valve cap 60a to the valve body. The connection of the threaded valve cap 60a to the threaded nut 30 of the valve body 12 may be sealed using an O-ring seal 62a disposed between an end of the threaded cap and the valve body, and particularly between the end of the threaded cap and the washer 30a. Similarly, the second solenoid component 14b may be replaced by a threaded valve cap 60b. After the spring 18b is inserted in the valve body 12 and secured with the washer 20b, the valve cap 60b is threaded into the opposite threaded nut of the valve body to secure the valve cap 60b to the valve body. The connection of the threaded cap 60b to the valve body 12 may be sealed using an O-ring seal 62b disposed between an end of the threaded cap and the valve body, and particularly between the end of the threaded cap and the washer 30b.

The use of the threaded valve cap 60a/60b has two principal purposes. In the event of damage to an electrical element of one of the solenoid components (e.g., the solenoid coil), the entire damaged solenoid component can be removed from the valve body and replaced with the threaded valve cap. The threaded valve cap may be installed to the valve body via the threaded nut to hold the valve components in a desired position until the damaged solenoid component can be replaced. As another option, one of the solenoid components may be replaced with the threaded valve cap to implement a single solenoid configuration in which only one solenoid component drives the valve components.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve assembly comprising:
    a valve body that houses a valve component for controlling a flow of fluid through the valve body; and
    at least one solenoid component that controls operation of the valve component;
    wherein the at least one solenoid component comprises a connector cap that is attached to a solenoid base, the connector cap having a plurality of electrical connection openings including a first electrical connection opening and a second electrical connection opening that are oriented at different directions relative to each other, and the first and second electrical connection openings are configurable at multiple orientations corresponding to different directions of electrical connection paths with the solenoid component;
    wherein the at least one solenoid component is rotatable about a longitudinal axis of the at least one solenoid component relative to the valve body to configure the first and second electrical connection openings at one of multiple first orientations, wherein each of the multiple first orientations corresponds to a rotational position of the at least one solenoid component relative to the valve body;
    wherein the connector cap is rotatable about a transverse axis of the at least one solenoid component relative to the solenoid base to configure the first and second electrical connection openings at one of multiple second orientations, wherein each of the multiple second orientations corresponds to a rotational position of the connector cap relative to the solenoid base.

2. The valve body of claim 1, wherein the at least one solenoid component includes a threaded retainer and the valve body includes a threaded nut, and the at least one solenoid component is rotatably connected to the valve body by interaction of the threaded retainer and the threaded nut.

3. The valve assembly of claim 1, wherein the multiple second orientations are indexed at 90° positions relative the solenoid base.

4. The valve assembly of claim 3, wherein the connector cap includes a plurality of planar faces that alternate with a plurality of curved faces, the plurality of planar faces and the plurality of curved faces extending from a base plate, and the plurality of curved faces constitute recesses for positioning fastening elements to index the 90° positions relative to the solenoid base.

5. The valve assembly of claim 1, further comprising a plug that is received in one of the first electrical connection opening or the second electrical connection opening, wherein the one of the first fluid electrical connection or the second electrical connection opening that receives the plug is an unused electrical connection and is blocked, and the other of the first electrical connection opening or the second electrical connection opening that does not receive the plug is a used electrical that permits electrical connection with the solenoid component.

6. The valve assembly of claim 5, further comprising a washer that is positioned between and end of the plug and the one of the first fluid opening or the second electrical connection opening that receives the plug.

7. The valve assembly of claim 1, wherein the first electrical connection opening opens in a first direction and the second electrical connection opening opens in a second direction, and the first and second directions are perpendicular to each other.

8. The valve assembly of claim 1, wherein the valve components include a spool that is acted upon by the at least one solenoid component.

9. The valve assembly of claim 1, wherein the at least one solenoid component includes a first solenoid component and a second solenoid component positioned on opposite sides of the valve body.

10. The valve assembly of claim 9, wherein:
the first solenoid component includes a first threaded retainer and the second solenoid component includes a second threaded retainer;
the valve body includes a first threaded nut for receiving the first threaded retainer and a second threaded nut for receiving the second threaded retainer; and the first and second solenoid components are rotatably connected to the valve body by respective interactions of the first and second threaded retainers and the first and second threaded nuts.

11. The valve assembly of claim 10, further comprising a threaded valve cap that is receivable within the first and the second threaded nuts, wherein the first solenoid component is replaced with the threaded valve cap when the valve cap is received in the first threaded nut, and the second solenoid component is replaced with the threaded valve cap when the threaded valve cap is received in the second threaded nut.

12. The valve assembly of claim 11, wherein a connection of the threaded valve cap to the threaded nut that receives the threaded valve cap is sealed using an O-ring seal.

* * * * *